(12) United States Patent
Kumru et al.

(10) Patent No.: US 8,822,573 B2
(45) Date of Patent: Sep. 2, 2014

(54) CHEMICAL TWO-COMPONENT MORTAR COMPOUND WITH IMPROVED ADHESION TO THE SURFACE OF PARTIALLY CLEANED AND/OR MOIST HOLES IN MINERAL SUBSTRATES, AND THE USE OF SUCH A CHEMICAL TWO-COMPONENT MORTAR COMPOUND

(75) Inventors: Memet-Emin Kumru, Augsburg (DE); Frank Thiemann, Landsberg/Lech (DE); Sandra Baur, Lamerdingen (DE)

(73) Assignee: Hilti Aktiengesellschaft, Schaan (LI)

( * ) Notice: Subject to any disclaimer, the term of this patent is extended or adjusted under 35 U.S.C. 154(b) by 388 days.

(21) Appl. No.: 13/065,696

(22) Filed: Mar. 28, 2011

(65) Prior Publication Data

US 2011/0236612 A1    Sep. 29, 2011

(30) Foreign Application Priority Data

Mar. 29, 2010  (DE) .......................... 10 2010 013 196

(51) Int. Cl.
| | |
|---|---|
| *C04B 14/06* | (2006.01) |
| *C04B 14/22* | (2006.01) |
| *C04B 24/42* | (2006.01) |
| *C04B 26/06* | (2006.01) |
| *C04B 26/32* | (2006.01) |
| *C04B 28/02* | (2006.01) |
| *C04B 26/16* | (2006.01) |
| *C04B 26/02* | (2006.01) |
| *C04B 40/06* | (2006.01) |
| *C04B 111/00* | (2006.01) |

(52) U.S. Cl.
CPC ................ *C04B 26/02* (2013.01); *C04B 26/16* (2013.01); *C04B 2111/00715* (2013.01); *C04B 28/02* (2013.01); *C04B 40/065* (2013.01); *C04B 26/06* (2013.01)
USPC ........ 524/3; 524/4; 524/5; 524/401; 524/436; 524/437; 524/444; 524/547; 524/558; 524/588; 524/650; 524/800; 524/849; 156/293; 156/307.1; 156/329; 156/332; 525/244; 525/259; 525/263; 525/288; 525/342; 525/479

(58) Field of Classification Search
USPC ........... 156/293, 307.1, 329, 332; 524/3, 4, 5, 524/401, 436, 437, 444, 547, 558, 588, 650, 524/800, 849; 525/244, 259, 263, 288, 342, 525/479
See application file for complete search history.

(56) References Cited

U.S. PATENT DOCUMENTS

| | | | |
|---|---|---|---|
| 4,306,042 A * | 12/1981 | Neefe .............................. | 522/99 |
| 6,118,015 A | 9/2000 | Haas et al. | |
| 6,552,120 B1 | 4/2003 | Haerzschel et al. .......... | 524/374 |
| 2009/0068477 A1 | 3/2009 | Buck ............................. | 428/448 |
| 2009/0099283 A1 * | 4/2009 | Ishihara et al. ............... | 524/107 |
| 2009/0270529 A1 * | 10/2009 | Kume et al. ................... | 523/122 |
| 2010/0084092 A1 * | 4/2010 | Curet et al. ................... | 156/334 |
| 2010/0294676 A1 | 11/2010 | Gruen et al. .................. | 206/223 |
| 2012/0302695 A1 * | 11/2012 | Osae et al. .................... | 524/504 |

FOREIGN PATENT DOCUMENTS

| | | |
|---|---|---|
| DE | 196 31 144 | 2/1997 |
| DE | 198 53 489 A1 | 5/2000 |
| DE | 10 2006 054 471 A1 | 5/2008 |
| EP | 1 857 188 A1 | 11/2007 |
| WO | WO 2008/080913 A1 * | 7/2008 |

OTHER PUBLICATIONS http://web.archive.org/web/20100305135024/http://en.wikipedia.org/wiki/Mortar_(masonry); Mar. 2010.*
Simionescu, Aflori, Olaru:"Mineral composition and stone conversation of cultural heritage building materials studies a PCRD", Kristallogr. Suppl. 30 (2009), pp. 471-476.

* cited by examiner

*Primary Examiner* — Roberto Rabago
(74) *Attorney, Agent, or Firm* — Davidson, Davidson & Kappel, LLC

(57) ABSTRACT

A chemical two-component mortar compound including a resin component (A) that contains at least one radically curable, ethylenically unsaturated compound (a) as the curable component, and including a separately arranged so as to inhibit reaction curing component (B) that contains a curing agent for the resin of the resin component (A), with improved adhesion to the surface of partially cleaned and/or moist holes in mineral substrates, characterized by a content of 0.2% to 10% by weight of at least one (meth)acryloxy alkyl trialkoxy siloxane and/or poly(meth)acryloxy alkyl silsesquioxane as an additional component (b) of the resin component (A); it also describes magazines, cartridges or plastic bags containing this chemical two-component mortar compound in two or more chambers that are separate from each other, in which the resin component (A) or the curing component (B) are arranged separately so as to inhibit a reaction; and it also describes its use to chemically fasten structural elements in mineral substrates.

18 Claims, No Drawings

CHEMICAL TWO-COMPONENT MORTAR COMPOUND WITH IMPROVED ADHESION TO THE SURFACE OF PARTIALLY CLEANED AND/OR MOIST HOLES IN MINERAL SUBSTRATES, AND THE USE OF SUCH A CHEMICAL TWO-COMPONENT MORTAR COMPOUND

This claims the benefit of German Patent Application DE 10 2010 013 196.2, filed Mar. 29, 2010 and hereby incorporated by reference herein.

The subject matter of the invention is a chemical two-component mortar compound comprising a resin component (A) that contains at least one radically curable, ethylenically unsaturated compound (a) as the curable component, and comprising a separately arranged so as to inhibit reaction curing component (B) that contains a curing agent for the resin of the resin component (A), with improved adhesion to the surface of partially cleaned and/or moist holes in mineral substrates; the invention also relates to magazines, cartridges and plastic bags containing this two-component mortar compound; and the invention also relates to its use to chemically fasten threaded anchor rods, reinforcement steel, threaded bushings and screws in drilled holes in mineral substrates.

BACKGROUND

Chemical two-component mortar compounds of the above-mentioned type are used in order to fasten structural elements such as threaded anchor rods, reinforcement steel, threaded bushings and screws in drilled holes present in mineral substrates such as concrete, natural stone, stucco, etc., namely, whenever high load values have to be achieved for the fixation. When such compounds are used, first of all, the holes that receive the structural elements to be fastened are drilled with the appropriate dimensions in the mineral substrate. Subsequently, the drilled holes have to be freed of drilling dust, and then—after the resin component and the curing component have been mixed—the chemical two-component mortar compound is injected into the drilled hole, after which the structural element that is to be fastened is inserted into the drilled hole that is filled with the mortar compound and adjusted. A secure fixation of the structural element is achieved after the curing step as a result of the reaction of the resin component with the curing compound.

The load values of the structural elements fastened in this manner and thus their load-bearing behavior depend on a number of influencing variables which, in the literature, are divided into two classes, namely, internal and external variables. The external influencing variables include, among other things, the way the drilled hole is cleaned, the quality of the mineral substrate, for example, of the concrete, its moisture content and its temperature as well as the way the drilled hole is made.

The internal influencing variables include the chemical composition of the mortar compound, its production process and its packaging, which, as a rule, comprises two components that are either held in separate vessels such as magazines, glass cartridges, cartridges or plastic bags and the like, or that are used with injection systems or casting systems.

German Preliminary Published Application DE 10 2006 054 471 A1 discloses a multi-component synthetic resin system, especially for fastening fixing elements, particularly anchoring means, in recesses, preferably drilled holes. This multi-component synthetic resin system contains one or more finely dispersed gases in at least one of its components in order to improve the durability and/or the pressing properties.

European patent application EP 1 857 188 A1 describes the use of an ultrasonic atomizer for applying a hydrolyzable liquid onto at least one substrate surface in order to improve the adhesion to substrates. Here, the hydrolyzable liquid can be an adhesion promoter composition containing at least one adhesion promoter substance selected from the group consisting of organo-silicon compounds, organo-titanium compounds and organo-zirconium compounds. Through the use of the ultrasonic atomizer, the adhesion promoter composition is applied onto the substrate surface using a carrier gas so as to achieve a pretreatment of the substrate surface in this manner.

The subject matter of German patent application DE 198 53 489 A1 is the use of aqueous polymer dispersions or of polymer powders that can be redispersed in water and that are based on protective colloid-stabilized vinyl aromatic 1,3-diene copolymers in construction adhesive formulations, whereby the polymer dispersions and the polymer powders are produced by means of the emulsion polymerization of a mixture containing at least one vinyl aromatic compound and at least one 1,3-diene in the presence of one or more protective colloids. In this process, it is possible to add copolymerizable monomers to the monomer phase. In addition to numerous ethylenically unsaturated compounds, it is also possible to use silicon-functional comonomers such as acryloxy propyl tri(alkoxy) silanes and methacryloxy propyl tri(alkoxy) silanes, vinyl trialkoxy silanes, and vinyl methyl dialkoxy silanes.

SUMMARY OF THE INVENTION

It has been found that another crucial variable that has not been addressed in the state of the art and that influences the load-bearing behavior of the chemical mortar compound is the quality of the cleaning of the drilled hole and the moisture content of the mineral substrate. It has been proven that, in moist holes and in drilled holes from which the drilling dust has only been poorly cleaned, the performance drops considerably, which is reflected in diminished load values.

In order to overcome this drawback, the state of the art calls, on the one hand, for taking greater care in cleaning the drilled holes and, on the other hand, for making sure that the drilled holes are not moist, since otherwise a reduction in the load value will have to be expected.

It is an object of the present invention to provide a chemical two-component mortar compound comprising a resin component (A) that contains at least one radically curable, ethylenically unsaturated compound (a) as the curable component, and comprising a separately arranged so as to inhibit reaction curing component (B) that contains a curing agent for the resin of the resin component (A), with improved adhesion to the surface of partially cleaned and/or moist holes in mineral substrates, for example, concrete.

Surprisingly, it has been found that this objective can be achieved in that at least a methacryloxy alkyl trialkoxy silane and/or a poly(meth)acryloxy alkyl silsesquioxane is incorporated as an additional constituent into the resin component.

The proper use of such a two-component mortar compound results in greatly increased load values for the fastened structural elements in dry, cleaned drilled holes as well as in partially cleaned and/or moist holes. This improvement of the load values in partially cleaned and/or moist holes is extremely surprising, since the curing component normally contains water as the phlegmatizing agent for the peroxide that is used as the curing agent. Regardless of the presence of the water, the use of methacryloxy alkyl trialkoxy silane and/or poly(meth)acryloxy alkyl silsesquioxane accounts for considerably less deterioration of the load values in partially cleaned and/or moist holes in comparison to load values in well-cleaned, dry drilled holes.

Consequently, the subject matter of the invention is the chemical two-component mortar compound according to the main claim. The subordinate claims relate to preferred embodiments of this mortar compound as well as to their use to chemically fasten threaded anchor rods, reinforcement steel, threaded bushings and screws in drilled holes in mineral substrates, especially concrete.

DETAILED DESCRIPTION

Consequently, the invention relates to a chemical two-component mortar compound comprising a resin component (A) that contains at least one radically curable, ethylenically unsaturated compound (a) as the curable component, and comprising a separately arranged so as to inhibit reaction curing component (B) that contains a curing agent for the resin of the resin component (A), with improved adhesion to the surface of partially cleaned and/or moist holes in mineral substrates, which is characterized by a content of 0.2% to 10% by weight, preferably 2% to 5% by weight, even more preferably 3% to 4% by weight, of at least one (meth)acryloxy alkyl siloxane and/or poly(meth)acryloxy alkyl silsesquioxane as an additional component (b) of the resin component (A).

Preferably, as the additional component (b), the resin component (A) contains at least one (meth)acryloxy alkyl siloxane having the general formula (I):

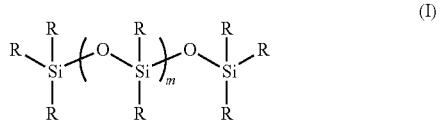

(I)

wherein R stands for identical or different alkyl groups having 1 or 2 carbon atoms, for trimethyl siloxy groups or for (meth)acryloxy alkyl groups having the formula (II):

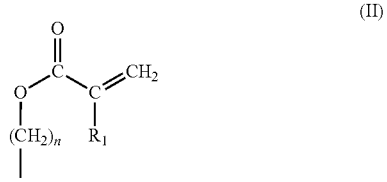

(II)

wherein $R_1$ stands for a hydrogen atom or for a methyl group, n is an integer with a value from 1 to 3, and m is an integer with a value from 1 to 400, with the proviso that at least one of the R groups stands for a methacryloxy alkyl group having the formula (II).

As the component (b), special preference is given to the representatives of the group comprising 3-methacryloxy propyl-pentamethyl disiloxane, 1,3-bis(3-methacryloxy propyl)-tetrakis-(trimethyl siloxy) disiloxane, 1,3-bis(3-methacryloxy propyl)-tetramethyl disiloxane, poly(acryloxy propyl methyl) siloxane (preferably with a molecular weight in the range from 3000 to 6000 and a viscosity from 50 to 125 cSt), monomethacryloxy propyl-terminated polydimethyl siloxane (with a molecular weight in the range from 600 to 12,000, and a viscosity in the range from 6 to 250 cSt, preferably with a molecular weight of 800 to 1200, and a viscosity of 10 cSt), dimethyl siloxane copolymer carrying acryloxy propyl side groups, methacryloxy propyl heptaisobutyl-T8 silsesquioxane, 15% to 20% (acryloxy propyl)-methyl siloxane/80% to 85% dimethyl siloxane copolymers, dimethyl siloxane copolymer carrying methacryloxy propyl side groups (preferably with a molecular weight in the range from 500 to 700), and methacryloxy propyl-terminated polydimethyl siloxane (with a molecular weight in the range from 550 to 30,000 and a viscosity from 3 to 1150 cSt).

According to a preferred embodiment, as the radically curable, ethylenically unsaturated compound (a), the resin component (A) contains at least one representative of the group comprising hydroxy butyl vinyl ether, diethylene glycol divinyl ether, triethylene glycol divinyl ether, 3-amino propyl vinyl ether, t-amyl vinyl ether, butyl vinyl ether, cyclohexane dimethanol monovinyl ether, cyclohexyl vinyl ether, 3-diethyl amino propyl vinyl ether, diethylene glycol monovinyl ether, dodecyl vinyl ether, ethylene glycol butyl vinyl ether, ethylene glycol monovinyl ether, 2-ethyl hexyl vinyl ether, ethyl vinyl ether, hexane diol monovinyl ether, hydroxy butyl vinyl ether, methyl vinyl ether, octadecyl vinyl ether, polyethylene glycol-520-methyl vinyl ether, triethylene glycol methyl vinyl ether, butane diol divinyl ether, cyclohexane dimethanol divinyl ether, diethylene glycol divinyl ether, dipropylene glycol divinyl ether, ethylene glycol divinyl ether, hexane diol divinyl ether, neopentyl glycol divinyl ether, tetraethylene glycol divinyl ether, triethylene glycol divinyl ether, trimethylol propane trivinyl ether, tripropylene glycol divinyl ether, pentaerythritol tetravinyl ether, allyl ether, di(propylene glycol) allyl ether(meth)acrylate (isomer mixture), diethylene glycol monoallyl ether, pentaerythritol allyl ether, trimethylol propane allyl ether, trimethylol propane diallyl ether, allyl benzyl ether, bisphenol-A-diallyl ether, allyl butyl ether, allyl ethyl ether, allyl glycidyl ether, allyl phenyl ether, allyl propyl ether, poly(epichlorohydrine-co-ethylene oxide-co-allyl glycidyl ether), ethylene glycol monoallyl ether, tetraethylene glycol diallyl ether, ethoxylated bisphenol-A-di(meth)acrylate with an ethoxylation degree of 2 to 10, preferably of 2 to 4, difunctional, trifunctional or higher-functional urethane (meth)acrylate oligomers and mixtures of these curable components. As the radically curable, ethylenically unsaturated compounds (a), special preference is given to the difunctional urethane (meth) acrylate oligomers having 2 to 30, preferably 5 to 15, urethane (meth)acrylate units.

According to a preferred embodiment of the invention, as the additional component (c), the resin component (A) contains at least one reactive thinner selected from the group comprising hydroxy propyl (meth)acrylate, butane diol-1,2-di(meth)acrylate, trimethylol propane tri(meth)acrylate, 2-ethyl hexyl (meth)acrylate, phenyl ethyl (meth)acrylate, tetrahydrofurfuryl (meth)acrylate, ethyl triglycol (meth)acrylate, N,N-dimethyl aminoethyl (meth)acrylate, N,N-dimethyl aminomethyl (meth)acrylate, 1,4-butane diol di(meth)acrylate, acetoacetoxy ethyl (meth)acrylate, 1,2-ethane diol di(meth)acrylate, isobornyl (meth)acrylate, diethylene glycol di(meth)acrylate, methoxy polyethylene glycol mono(meth)acrylate, trimethyl cyclohexyl (meth)acrylate, 2-hydroxy ethyl (meth)acrylate, dicyclopentenyloxy ethyl (meth)acrylate, tricyclopentadienyl di(meth)acrylate, bisphenol-A-(meth)acrylate, novolak epoxy di(meth)acrylate, di-[(meth)acryloyl maleoyl]-tricyclo5.2.1.0.$^{2.6}$-decane, dicyclopentenyloxy ethyl crotonate, 3-(meth)acryloyloxy methyl tricyclo-5.2.1.0.$^{2.6}$-decane, 3-(methyl)-cyclopentadienyl (meth)acrylate, isobornyl (meth)acrylate and/or dodecyl-2-(meth)acrylate.

The reaction diluter (c) serves as a comonomer and leads to a further improvement of the adhesion of the cured mortar compound to the surfaces of the mineral substrate or of the structural element that is to be fastened.

The nomenclature used here "(meth)acrylic . . . " means that this description includes the " . . . methacrylic . . . " as well as the " . . . acrylic . . . " compounds.

According to another preferred embodiment of the invention, the resin component (A) contains an accelerator (d) for the curing agent, preferably an aromatic amine and/or a salt of cobalt, manganese, tin, vanadium or cerium. Especially preferred accelerators (d) are N,N-dimethyl aniline, N,N-diethyl aniline, N,N-diisopropanol-p-toluidine, N,N-diisopropylidene-p-toluidine, N,N-dimethyl-p-toluidine, N,N-diethylol-p-toluidine, N,N-diisopropylol-m-toluidine, N,N-bis(2-hydroxy ethyl)-toluidine, N,N-bis(2-hydroxy ethyl)-xylidine, N-methyl-N-hydroxy ethyl-p-toluidine, cobalt octoate, cobalt naphthenate, vanadium(IV)-acetyl acetonate and/or vanadium(V)-acetyl acetonate.

Moreover, the resin component (A) can contain a conventional polymerization inhibitor such as methyl hydroquinione, hydroquinone, pyrocatechol, hydroquinone monomethyl ether, mono-t-butyl hydroquinone, 2,5-di-t-butyl hydroquinone, p-benzoquinone, 2,5-diphenyl-p-benzoquinone, picric acid, phenothiazine, t-butyl pyrocatechine, 2-butyl-4-hydroxy anisol and 2,6-di-t-butyl-p-cresol.

Finally, in the resin component (A) and/or the curing component (B), the chemical two-component mortar compound according to the invention, as is common for such products, contains at least one inorganic filler such as quartz, glass, corundum, porcelain, stoneware, heavy spar, light spar, gypsum, talcum and/or chalk in the form of sand, powders or molded parts, preferably in the form of fibers or beads.

The curing agent contained in the curing component (B) of the chemical two-component mortar compound according to the invention and intended for the resin of the resin component preferably comprises at least one organic peroxide, more preferably dibenzoyl peroxide, methyl ethyl ketone peroxide, tert.-butyl perbenzoate, cyclohexanone peroxide, lauryl peroxide, cumene hydroperoxide and/or tert.-butyl peroxy-2-ethyl hexanoate. These peroxides are preferably phlegmatized, namely, through the addition of water as the phlegmatizing agent, whereby products of this type are known to the person skilled in the art and are commercially available on the market.

According to another preferred embodiment of the invention, the resin component (A), in addition to the resin, also contains a hydraulically setting or polycondensable inorganic compound such as cement, preferably cement that contains little or no iron oxide, such as aluminate cement, and/or gypsum, whereby in this case, the curing component (B), in addition to the curing agent and the water needed for the phlegmatization, also contains water for the curing of the hydraulically setting or polycondensable inorganic compound.

The two-component mortar compound according to the invention is preferably contained in magazines, cartridges or plastic bags, which are characterized in that they comprise two or more chambers that are separate from each other, in which the resin component (A) or the curing component (B) of the type defined above—together with the optionally present additional components—are arranged separately so as to inhibit a reaction.

Surprisingly, it has been found that, during proper use of the two-component mortar compound according to the invention, a general improvement in the performance of the system can be achieved, especially an improvement in the sturdiness of the system, in other words, the achieved high load values are retained, even in the case of moist holes and/or of poor cleaning of the holes that have been drilled into the substrate. This increase in the load values with only moderately cleaned drilled holes and/or with moist holes was not to be expected and is especially surprising in view of the fact that the curing agent present in the curing component of the mortar compound according to the invention, namely, the above-mentioned peroxides, is preferably phlegmatized with water, so that it could not have been anticipated that the further addition of water would translate into an improvement in the adhesion to the surface of the drilled hole.

Therefore, the subject matter of the invention is also the use of the two-component mortar compound according to the invention to chemically fasten threaded anchor rods, reinforcement steel, threaded bushings and screws in drilled holes in mineral substrates, especially concrete.

The following examples serve to further elucidate the invention, but without restricting it in any way whatsoever.

EXAMPLE I

Two-component Mortar Compound on the Basis of a Urethane Methacrylate Oligomer

First of all, the resin component (A) of the two-component mortar compound is prepared in that 39.3 g of the resin indicated in Table 1 below (that is to say, of the comparison resin UMA-REF and of the resin according to the invention UMA-3) are homogenized with 37.2 g of a quartz sand (e.g. S32), 20.5 g of an aluminate cement, and 3 g of a hydrophobic pyrogenic silica acid in a dissolver under a vacuum to form a pasty compound that is free of air bubbles.

The comparison resin UMA-REF does not contain siloxane, whereas the resin UMA-4 contains 4.0% by weight of a component (b) according to the invention, namely, in each case, one of the following methacryloxy alkyl siloxanes:

siloxane 1: 3-methacryloxy propyl pentamethyl disiloxane siloxane 2: 1,3-bis(3-methacryloxy propyl)-tetrakis(trimethyl siloxy) disiloxane siloxane 3: poly(acryloxy propyl methyl) siloxane (molecular weight of 3000 to 6000; viscosity of 50 to 125 cSt)

siloxane 4: monomethacryloxy propyl-terminated polydimethyl siloxane (with a molecular weight of 800 to 1200, and a viscosity of 10 cSt)

siloxane 5: 1,3-bis(3-methacryloxy propyl)-tetramethyl disiloxane

The resin components (A) obtained in this manner are each placed into a cartridge.

As the curing component (B) of the two-component mortar compound, an aqueous benzoyl peroxide suspension is used that contains 64% by weight of filler in the form of a mixture of quartz powder and pyrogenic silicic acid, 12.4% by weight of benzoyl peroxide and water as the remainder; this is then filled into a second cartridge.

TABLE 1

| Resin | Comparison UMA-REF [% by weight] | Invention UMA-4 [% by weight] |
|---|---|---|
| urethane methacrylate oligomer, difunctional (a) | 32.61 | 32.61 |
| butanediol-1,4-dimethacrylate (c) | 32.62 | 32.62 |
| hydroxy propyl methacrylate (c) | 32.62 | 28.62 |

TABLE 1-continued

| Resin | Comparison UMA-REF [% by weight] | Invention UMA-4 [% by weight] |
|---|---|---|
| p-toluidine (accelerator) (d) | 1.70 | 1.70 |
| inhibitor (Tempol*) | 0.45 | 0.45 |
| methacryloxy alkyl siloxane (b) | 0 | 4.00 |
| | 100 | 100 |

*Tempol = 4-hydroxy-2,2,6,6-tetramethyl-piperidinooxyl

During proper use, the resin component (A) and the curing component (B) are pressed out of the cartridges and fed through a static mixer, as a result of which the reaction of these components begins, resulting in curing of the reaction resin and of the cement. The reacting compound is injected into the drilled hole, after which the structural element that is to be fastened is inserted and adjusted.

EXAMPLE 2

In order to determine the load values that are achieved with these two-component mortar compounds, a high-strength threaded anchor rod M12 was used, which was plugged along with the two-component mortar compound according to the invention into a drilled hole having a diameter of 14 mm and a drilled depth of 72 mm. After a curing time of 1 hour at room temperature, the mean failure load was determined by centered extraction of the threaded anchor rod with a tight support, and the mean failure load of five anchors was determined.

The examined drilled holes were prepared as follows:
1. Dry concrete (comparison): dry, cleaned drilled hole (vacuum cleaned—brushed three times—vacuum cleaned), setting and curing of the threaded anchor rods at room temperature;
2. Damp concrete (invention): partially cleaned and moist hole (Putzi*—brushed once—Putzi*). Setting and curing of the threaded anchor rods at room temperature.*) Putzi=a device like a bicycle pump with which the drilling dust is blown out The bond stresses achieved for dry drilled holes (complete cleaning) using the mortar formulations described in Example 1 as well as for moist holes with less cleaning are compiled in Table 2 below:

TABLE 2

| | Bond stress [N/mm²] | | |
|---|---|---|---|
| | dry concrete | moist concrete | Difference [%] |
| resin without siloxane (comparison) | 28.0 ± 1.3 | 18.3 ± 0.7 | −34.5 |
| resin + 4% siloxane 1 | 24.9 ± 1.4 | 22.5 ± 0.7 | −9.7 |
| resin + 4% siloxane 2 | 26.7 ± 0.2 | 23.1 ± 1.0 | −13.5 |
| resin + 4% siloxane 3 | 26.7 ± 0.4 | 23.7 ± 0.9 | −11.2 |
| resin + 4% siloxane 4 | 24.8 ± 1.1 | 24.0 ± 2.2 | −3.1 |
| resin + 4% siloxane 5 | 25.5 ± 1.6 | 25.0 ± 1.8 | −1.7 |

As can be seen in Table 2 above, the two-component mortar compound according to the invention provides not only an improved adhesion of the anchor rods to dry and thoroughly cleaned concrete, but it also translates into considerably less reduction of the load values when used in poorly cleaned and moist holes.

What is claimed is:

1. A chemical two-component mortar compound comprising:
   a resin component (A) containing at least one radically curable, ethylenically unsaturated compound (a) as a curable resin, the resin component (A) having a content of 0.2% to 10% by weight of at least one (meth) acryloxy alkyl siloxane and/or poly(meth)acryloxy alkyl silsesquioxane as an additional component (b) of the resin component (A); and
   a separately arranged so as to inhibit reaction curing component (B) containing a curing agent for the curable resin of the resin component (A),
   wherein the resin component (A), in addition to the resin, also contains a hydraulically setting or polycondensable inorganic compound, and the curing component (B), in addition to the curing agent, also contains water.

2. The chemical two-component mortar compound as recited in claim 1 wherein as the additional component (b), the resin component (A) contains a (meth)acryloxy alkyl siloxane having the general formula (I):

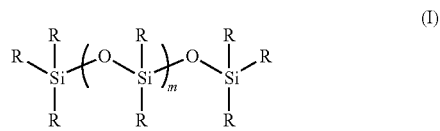

wherein R stands for identical or different alkyl groups having 1 or 2 carbon atoms, for trimethyl siloxy groups or for (meth)acryloxy alkyl groups having the formula (II):

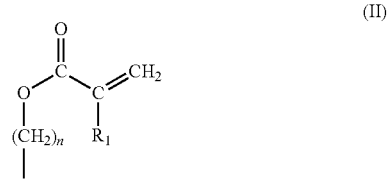

wherein $R_1$ stands for a hydrogen atom or for a methyl group, n is an integer with a value from 1 to 3, and m is an integer with a value from 1 to 400, with the proviso that at least one of the R groups stands for a methacryloxy alkyl group having the formula (II).

3. The chemical two-component mortar compound as recited in claim 1 wherein, as the additional component (b), the resin component (A) contains at least one representative of the group selected from the group consisting of 3-methacryloxy propyl-pentamethyl disiloxane, 1,3-bis(3-methacryloxy propyl)-tetrakis (trimethyl siloxy) disiloxane, 1,3-bis(3-methacryloxy propyl)-tetramethyl disiloxane, poly(acryloxy propyl methyl) siloxane, monomethacryloxy propyl-terminated polydimethyl siloxane, dimethyl siloxane copolymer carrying acryloxy propyl side groups, methacryloxy propyl heptaisobutyl-T8 silsesquioxane, 15% to 20% (acryloxy propyl)-methyl siloxane / 80% to 85% dimethyl siloxane copolymer, dimethyl siloxane copolymer carrying methacryloxy propyl side groups, and methacryloxy propyl-terminated polydimethyl siloxane.

4. The chemical two-component mortar compound as recited in claim 1 wherein, as the radically curable, ethylenically unsaturated compound (a), the resin component (A)

contains at least one representative of the group selected from the group consisting of hydroxy butyl vinyl ether, diethylene glycol divinyl ether, triethylene glycol divinyl ether, 3-amino propyl vinyl ether, t-amyl vinyl ether, butyl vinyl ether, cyclohexane dimethanol monovinyl ether, cyclohexyl vinyl ether, 3-diethyl amino propyl vinyl ether, diethylene glycol monovinyl ether, dodecyl vinyl ether, ethylene glycol butyl vinyl ether, ethylene glycol monovinyl ether, 2-ethyl hexyl vinyl ether, ethyl vinyl ether, hexane diol monovinyl ether, hydroxy butyl vinyl ether, methyl vinyl ether, octadecyl vinyl ether, polyethylene glycol-520-methyl vinyl ether, triethylene glycol methyl vinyl ether, butane diol divinyl ether, cyclohexane dimethanol divinyl ether, diethylene glycol divinyl ether, dipropylene glycol divinyl ether, ethylene glycol divinyl ether, hexane diol divinyl ether, neopentyl glycol divinyl ether, tetraethylene glycol divinyl ether, triethylene glycol divinyl ether, trimethylol propane trivinyl ether, tripropylene glycol divinyl ether, pentaerythritol tetravinyl ether, allyl ether, di(propylene glycol)-allyl ether(meth)acrylate (isomer mixture), diethylene glycol monoallyl ether, pentaerythritol allyl ether, trimethylol propane allyl ether, trimethylol propane diallyl ether, allyl benzyl ether, bisphenol-A-diallyl ether, allyl butyl ether, allyl ethyl ether, allyl glycidyl ether, allyl phenyl ether, allyl propyl ether, poly(epichlorohydrine-co-ethylene oxide-co-allyl glycidyl ether), ethylene glycol monoallyl ether, tetraethylene glycol diallyl ether, ethoxylated bisphenol-A-di(meth)acrylate with an ethoxylation degree of 2 to 10, preferably of 2 to 4, difunctional, trifunctional or higher-functional urethane (meth)acrylate oligomers and mixtures of these curable components.

5. The chemical two-component mortar compound as recited in claim 4 wherein, as the radically curable, ethylenically unsaturated compounds (a), the resin component (A) contains a difunctional urethane (meth)acrylate oligomer having 2 to 30 urethane (meth)acrylate units.

6. The chemical two-component mortar compound as recited in claim 1 wherein, as an additional component (c), the resin component (A) contains at least one reactive thinner selected from the group consisting of hydroxy propyl (meth)acrylate, butane diol-1,2-di(meth)acrylate, trimethylol propane tri(meth)acrylate, 2-ethyl hexyl (meth)acrylate, phenyl ethyl (meth)acrylate, tetrahydrofurfuryl (meth)acrylate, ethyl triglycol (meth)acrylate, N,N-dimethyl aminoethyl (meth)acrylate, N,N-dimethyl aminomethyl (meth)acrylate, 1,4-butanediol di(meth)acrylate, acetoacetoxy ethyl (meth)acrylate, 1,2-ethane diol di(meth)acrylate, isobornyl (meth)acrylate, diethylene glycol di(meth)acrylate, methoxy polyethylene glycol mono(meth)acrylate, trimethyl cyclohexyl (meth)acrylate, 2-hydroxy ethyl (meth)acrylate, dicyclopentenyloxy ethyl (meth)acrylate and/or tricyclopentadienyl di(meth)acrylate, bisphenol-A-(meth)acrylate, novolak epoxy di(meth)acrylate, di -[(meth)acryloyl maleoyl]-tricyclo5.2.1.0.$^{2.6}$-decane, dicylopentenyl oxy ethyl crotonate, 3-(meth)acryloyloxy methyl-tricyclo-5.2.1.0.$^{2.6}$-decane, 3-(methyl)-cyclopentadienyl (meth)acrylate and/or dodecyl-2-(meth)acrylate.

7. The chemical two-component mortar compound as recited in claim 1 wherein the resin component (A) contains an accelerator (d) for the curing agent.

8. The chemical two-component mortar compound as recited in claim 7 wherein, as the accelerator (d), the resin component (A) contains an aromatic amine and/or a salt of cobalt, manganese, tin, vanadium or cerium.

9. The chemical two-component mortar compound as recited in claim 8 wherein, as the accelerator (d), the resin component (A) contains N,N-dimethyl aniline, N,N-diethyl aniline, N,N-diisopropanol-p-toluidine, N,N-diisopropylidene-p-toluidine, N,N-dimethyl-p-toluidine, N,N-diethylol-p-toluidine, N,N-diisopropylol-m-toluidine, N,N-bis(2-hydroxy ethyl)-toluidine, N,N-bis(2-hydroxy ethyl)-xylidine, N-methyl-N hydroxy ethyl-p-toluidine, cobalt octoate, cobalt naphthenate, vanadium(IV)-acetyl acetonate and/or vanadium(V)-acetyl acetonate.

10. The chemical two-component mortar compound as recited in claim 1 further comprising at least one inorganic filler in the resin component (A) and/or the curing component (B).

11. The chemical two-component mortar compound as recited in claim 10 wherein the inorganic filler includes quartz, glass, corundum, porcelain, stoneware, heavy spar, light spar, gypsum, talcum and/or chalk in the form of sand, powders, fibers, beads or molded parts.

12. The chemical two-component mortar compound as recited in claim 11 wherein the inorganic filler is the form of fibers or beads.

13. The chemical two-component mortar compound as recited in claim 1 wherein, as the curing agent for the resin of the resin component (A), the curing component (B) contains at least one organic peroxide.

14. The chemical two-component mortar compound as recited in claim 13 wherein the at least one organic peroxide includes dibenzoyl peroxide, methyl ethyl ketone peroxide, tert.-butyl perbenzoate, cyclohexanone peroxide, lauryl peroxide, cumene hydroperoxide and/or tert.-butyl peroxy-2-ethyl hexanoate.

15. Magazines, cartridges or plastic bags containing a chemical two-component mortar compound as recited in claim 1 comprising:
a first chamber containing the resin component (A) and a second chamber separate from the first chamber containing the curing component (B), the first and scond chambers being arranged separately so as to inhibit a reaction.

16. A method for using the chemical two-component mortar compound as recited in claim 1 comprising: chemically fastening threaded anchor rods, reinforcement steel, threaded bushings or screws in drilled holes in mineral substrates using the chemical two-component mortar compound.

17. A method for using the chemical two-component mortar compound as recited in claim 1 comprising: using the mortar to provide improved adhesion to a surface of partially cleaned and/or moist holes in mineral substrates.

18. The chemical two-component mortar compound as recited in claim 1 wherein the hydraulically setting or polycondensable inorganic compound is cement or gypsum.

* * * * *